(12) United States Patent
El-Mahdy et al.

(10) Patent No.: US 9,009,119 B2
(45) Date of Patent: Apr. 14, 2015

(54) COMPRESSING A MULTIVARIATE DATASET

(71) Applicant: International Business Machines Corporation, Armonk, NY (US)

(72) Inventors: Ahmed H. El-Mahdy, Alexandria (EG); Hisham E. El-Shishiny, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/652,624

(22) Filed: Oct. 16, 2012

(65) Prior Publication Data

US 2013/0124489 A1    May 16, 2013

(30) Foreign Application Priority Data

Nov. 11, 2011 (GB) .................................. 1119488.3

(51) Int. Cl.
| G06F 17/00 | (2006.01) |
| G06T 9/00 | (2006.01) |
| H04N 19/184 | (2014.01) |
| H04N 19/503 | (2014.01) |
| H04N 19/90 | (2014.01) |

(52) U.S. Cl.
CPC .............. *G06T 9/004* (2013.01); *H04N 19/184* (2013.01); *H04N 19/503* (2013.01); *H04N 19/90* (2013.01)

(58) Field of Classification Search
CPC . H03M 7/30; H03M 7/3084; G06F 17/30067; G06F 17/30595; G06F 17/30961; G06F 17/30; G06T 9/004; H04N 19/00309; H04N 19/00945; H04N 19/00575; H04N 5/2351

USPC .......... 707/693, E17.002; 382/167, 274, 233, 382/238, 232; 384/441, 222.1, E11.007; 348/362, 14.13, 301, 294, 364; 375/240.03, 240.15, E07.243, E07.139
See application file for complete search history.

(56) References Cited

U.S. PATENT DOCUMENTS

| 4,445,138 | A | * | 4/1984 | Zwirn et al. ................... 348/672 |
| 5,051,916 | A | * | 9/1991 | Benson ............................ 702/76 |
| 5,363,098 | A | * | 11/1994 | Antoshenkov .................. 341/95 |
| 5,446,504 | A | | 8/1995 | Wada |
| 5,668,897 | A | * | 9/1997 | Stolfo .................... 707/E17.023 |
| 5,675,382 | A | * | 10/1997 | Bauchspies .............. 375/240.25 |

(Continued)

FOREIGN PATENT DOCUMENTS

| EP | 1426961 A1 | 9/2004 |
| WO | 2010105036 A1 | 9/2010 |
| WO | 2011002505 A1 | 1/2011 |

OTHER PUBLICATIONS

Otim, et al., "Modelling of High dynamic range Logarithmic CMOS image Sensors," IMTC 2004—Instrumentation and Measurement Technology Conference, IEEE, 2004, vol. 1 pp. 451-456.*

(Continued)

*Primary Examiner* — Anh Ly
(74) *Attorney, Agent, or Firm* — Winstead, P.C.

(57) ABSTRACT

A method, computer program product and system for compressing a multivariate dataset. A dataset is selected that includes a plurality of variates. A first compression method is applied to the values of a first variate of the dataset. A second compression method is applied to the values of a second variate of the dataset, where the second compression method is arranged to compress the second variate values relative to the variation of the corresponding first variate values.

25 Claims, 5 Drawing Sheets

(56) References Cited

U.S. PATENT DOCUMENTS

| | | | |
|---|---|---|---|
| 5,748,780 A * | 5/1998 | Stolfo | 382/232 |
| 6,539,391 B1 * | 3/2003 | DuMouchel et al. | 707/E17.058 |
| 6,661,845 B1 * | 12/2003 | Herath | 375/240.23 |
| 6,912,317 B1 * | 6/2005 | Barnes et al. | 382/232 |
| 8,111,933 B2 * | 2/2012 | Furihata et al. | 382/244 |
| 8,131,721 B2 * | 3/2012 | Kataoka et al. | 707/736 |
| 2003/0095197 A1 * | 5/2003 | Wheeler et al. | 382/275 |
| 2004/0092802 A1 * | 5/2004 | Cane et al. | 600/306 |
| 2004/0264809 A1 * | 12/2004 | Uetani | 382/300 |
| 2005/0012848 A1 * | 1/2005 | Hayaishi | 348/371 |
| 2005/0152606 A1 * | 7/2005 | Wood | 382/232 |
| 2005/0222775 A1 * | 10/2005 | Kisra et al. | 702/14 |
| 2006/0072799 A1 * | 4/2006 | McLain | 382/128 |
| 2006/0092271 A1 * | 5/2006 | Banno et al. | 348/14.13 |
| 2006/0143142 A1 * | 6/2006 | Vasilescu et al. | 706/20 |
| 2006/0158462 A1 | 7/2006 | Toyama et al. | |
| 2007/0014470 A1 | 1/2007 | Sloan | |
| 2007/0130165 A1 * | 6/2007 | Sjoblom et al. | 707/10 |
| 2007/0198192 A1 * | 8/2007 | Hsu et al. | 702/6 |
| 2008/0278495 A1 * | 11/2008 | Minamide et al. | 345/440 |
| 2009/0027558 A1 | 1/2009 | Mantiuk et al. | |
| 2009/0028398 A1 * | 1/2009 | Lundstrom | 382/128 |
| 2009/0060266 A1 * | 3/2009 | Sornborger et al. | 382/100 |
| 2009/0154800 A1 * | 6/2009 | Kojima et al. | 382/166 |
| 2009/0251715 A1 * | 10/2009 | Kita | 358/1.9 |
| 2009/0317017 A1 | 12/2009 | Au et al. | |
| 2010/0092096 A1 * | 4/2010 | Bernal et al. | 382/233 |
| 2010/0183225 A1 * | 7/2010 | Vantaram et al. | 382/173 |
| 2010/0202709 A1 * | 8/2010 | Heavens et al. | 382/248 |
| 2011/0043603 A1 * | 2/2011 | Schechner et al. | 348/25 |
| 2011/0080487 A1 * | 4/2011 | Venkataraman et al. | 348/218.1 |
| 2011/0090370 A1 * | 4/2011 | Cote et al. | 348/237 |
| 2011/0113288 A1 * | 5/2011 | Ramakrishnan et al. | 714/38.1 |
| 2011/0122287 A1 * | 5/2011 | Kunishige et al. | 348/229.1 |
| 2011/0122308 A1 * | 5/2011 | Duparre | 348/340 |
| 2011/0145238 A1 * | 6/2011 | Stork | 707/737 |
| 2011/0156896 A1 * | 6/2011 | Hoffberg et al. | 340/506 |
| 2011/0235928 A1 * | 9/2011 | Strom et al. | 382/233 |
| 2012/0020581 A1 * | 1/2012 | Zarom | 382/233 |
| 2012/0027280 A1 * | 2/2012 | Ramirez Giraldo et al. | 382/131 |
| 2012/0081577 A1 * | 4/2012 | Cote et al. | 348/231.99 |
| 2012/0127297 A1 * | 5/2012 | Baxi et al. | 382/173 |
| 2012/0263382 A1 * | 10/2012 | Robinson et al. | 382/191 |
| 2012/0310890 A1 * | 12/2012 | Dodd et al. | 707/646 |
| 2013/0121572 A1 * | 5/2013 | Paris et al. | 382/166 |
| 2013/0308876 A1 * | 11/2013 | Panter et al. | 382/284 |

OTHER PUBLICATIONS

Oliver Rübel et al.—"High performance multivariate visual data exploration for extremely large data"—Proceeding SC '08 Proceedings of the 2008 ACM/IEEE conference on Supercomputing Article No. 51 pp. 1-12.*

United Kingdom Search Report for Application No. GE31119468.3 dated Mar. 12, 2012.

Ward et al., "Subband Encoding of High Dynamic Range Imagery," http://www.anywhere.com/gward/papers/apgv04/APGVfinal.pdf, APGV '04 Proceedings of the 1st Symposium on Applied perception in graphics and visualization, 2004.

Yoshida et al., "Perceptual Evaluation of Tone Mapping Operators with Real-World Scenes," http://www.mpi-inf.mpg.de/~yoshida/Yoshida_SPIE2005.pdf, Proc. SPIE 5666, Human Vision and Electronic Imaging X, 192, Mar. 18, 2005.

Bonifazzi et al., "A Scanning Device for Multispectral Imaging of Paintings (Proceedings Paper)," http://spie.org/x648.html?product_id=620958&showAbstracts=true&origin_id=x648&pf=true&event_id=640315, Proceedings of SPIE vol. 6062, Jan. 15, 2006, Abstract.

Li et al., "High Dynamic Range Compression by Half Quadratic Regularization," http://dl.acm.org/citation.cfm?id=1819606, ICIP'09 Proceedings of the 16th IEEE international conference on Image processing, 2009, Abstract.

Geladi et al., "Multivariate and Hyperspectral Image Analysis," http://onlinelibrary.wiley.com/doi/10.1002/9780470027318.a8106.pub2/abstract, Jun. 13, 2008, Abstract.

Zhang et al., "Estimation of Saturated Pixel Values in Digital Color Imaging," http://www.ncbi.nlm.nih.gov/pmc/articles/PMC1815481/, JOSA A, vol. 21, Issue 12, 2004, pp. 2301-2310.

Cui et al., "Color-to-Gray Conversion Using ISOMAP," Vis Comput (2010) 26: 1349-1360, Published Online on Dec. 17, 2009.

Kotwal et al., "Visualization of Hyperspectral Images Using Bilateral Filtering," IEEE Transactions on Geoscience and Remote Sensing, vol. 48, No. 5, May 2010, First Published Jan. 22, 2010.

* cited by examiner

COMPRESSING A MULTIVARIATE DATASET

CROSS-REFERENCE TO RELATED APPLICATIONS

This application claims priority under 35 U.S.C. §119(a) from United Kingdom Patent Application No. 1119488.3, filed on Nov. 11, 2011, the contents of which are incorporated herein by reference.

TECHNICAL FIELD

The present invention relates generally to data compression techniques, and more particularly, to compressing a multivariate dataset.

BACKGROUND

In computer systems, data compression techniques are commonly applied to datasets so as to reduce the size of the dataset to facilitate its storage, use, visualization or transmission. Some datasets, such as image datasets, may be particularly large and comprise multiple variates.

Compression techniques are commonly used to reduce the dynamic range of the data values of large datasets, such as image datasets. Such compression techniques may be applied, for example, to a dataset comprising image data having dynamic ranges outside that which can be perceived with human sight or displayed on a computer screen. A given compression technique can be arranged to reduce the dynamic range of the image data so that the compressed image data can be displayed while preserving at least some of information from the original dataset that is outside the displayable range.

Existing compression techniques are applied to image data but are either restricted to the number of variates to which they may be applied or may result in loss of information, saturation of image regions or smoothing out of significant details.

BRIEF SUMMARY

In one embodiment of the present invention, a method for compressing a multivariate dataset comprises selecting a dataset comprising a plurality of variates. The method further comprises applying a first compression method to values of a first variate of the dataset. In addition, the method comprises applying, by a processor, a second compression method to values of a second variate of the dataset, where the second compression method is arranged to compress the second variate values relative to a variation of corresponding first variate values.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Embodiments of the present invention provide a method for compressing a multivariate dataset, the method comprising the steps of: selecting a dataset comprising a plurality of variates; applying a first compression method to the values of a first variate of the dataset; applying a second compression method to the values of a second variate of the dataset, wherein the second compression method is arranged to compress the second variate values relative to the variation of the corresponding first variate values.

The compression of the second variate values may be inversely related to the variation of the corresponding first variate values. The second variate values may be compressed relative to the uncompressed first variate values. The second variate values may be compressed relative to the compressed first variate values. The second variate values may be compressed to a predetermined range. The compressed second variate values may be interpolated to a predetermined set of value ranges. The interpolation may be linear. The dataset may represent image data and the first and second variates comprise pixel amplitude and frequency. The pixel amplitude may represent luminance. The first compression method may comprise a tone mapping method. The tone mapping method may be arranged to perform spatially uniform compression. The tone mapping method may be arranged to perform spatially varying compression.

Other forms of the embodiment of the method described above are in a system and in a computer program product.

Figure 1:
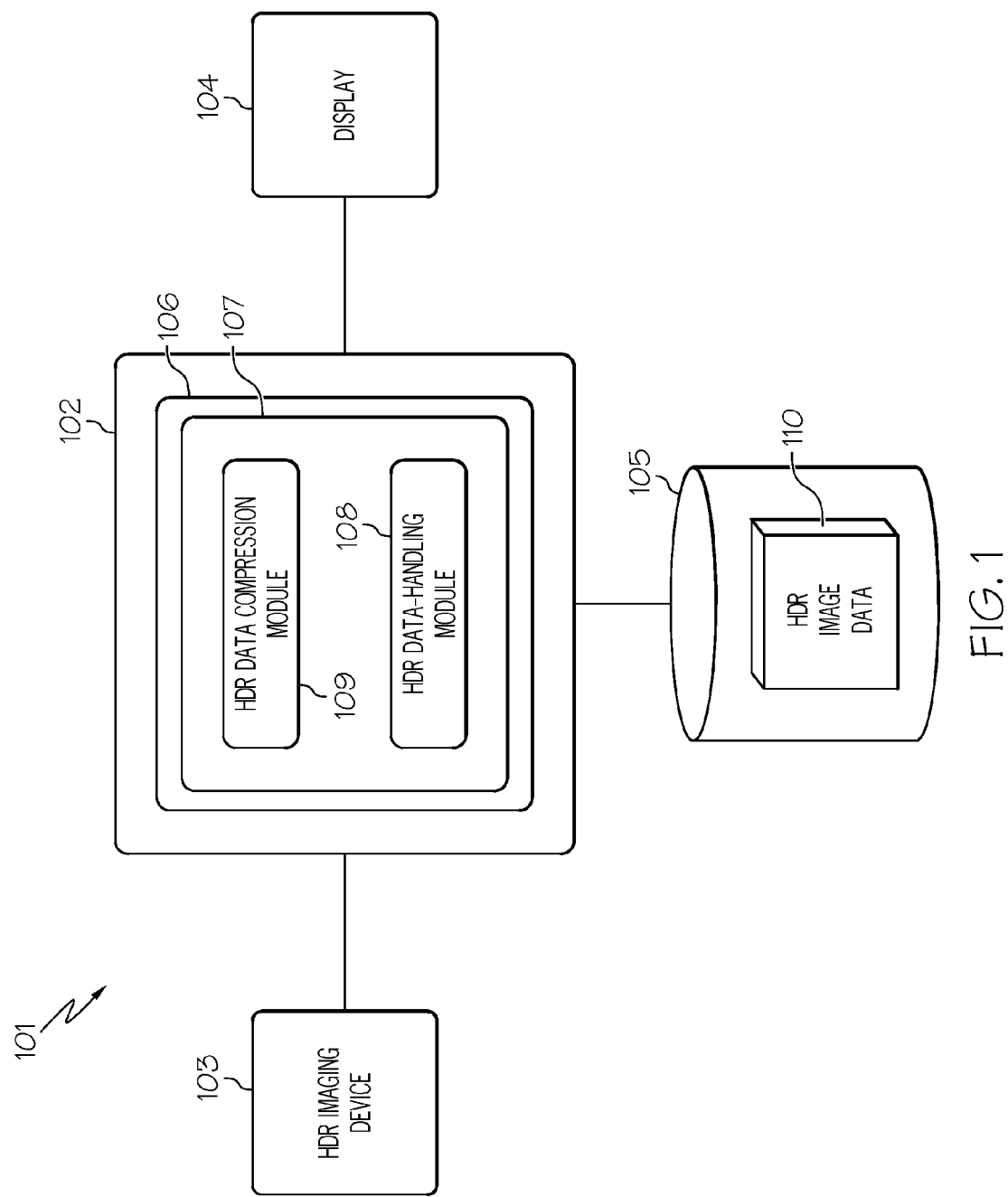
FIG. 1 is a schematic illustration of a computer system arranged to capture High Dynamic Range (HDR) images, compress the HDR images and output the compressed HDR images in accordance with an embodiment of the present invention.

Referring now to the Figures, FIG. 1 is a schematic illustration of a computer system arranged to capture High Dynamic Range (HDR) images, compress the HDR images and output the compressed HDR images in accordance with an embodiment of the present invention. As illustrated in FIG. 1, a computer based imaging system 101 comprises a computer 102 connected to a High Dynamic Range (HDR) imaging device 103, a display 104 and a storage device 105. The computer 102 is loaded with an operating system 106 arranged to provide a processing platform for an image processing application program 107. The image processing application program 107 comprises an HDR data-handling module 108 and an HDR data compression module 109. The data-handling module 108 is arranged to input HDR image data 110 from the HDR imaging device 103 and store the HDR image data 110 on the storage device 105. The data-handling module 108 is further arranged to enable display of the HDR image data 110 on the display 104 in accordance with a relevant user selection. The data compression module 109 is arranged to compress the HDR data 110 so as to enable the effective display of the HDR data 110 on the display 104.

In one embodiment, the HDR data 110 comprises image data having a high dynamic range of at least two variates in the form of the pixel luminance and pixel frequency. The ranges of these two variates exceed the range of human perception and also the displayable range of the display 104. Image data of such high dynamic range may therefore be referred to as hyper-spectral image data. With reference to FIG. 2A, FIG. 2A illustrates the structure of an uncompressed version of an HDR dataset in the computer system of FIG. 1 in accordance with an embodiment of the present invention. As illustrated in FIG. 2A, in conjunction with FIG. 1, the HDR data 110 may conveniently be viewed as an image stack or cube 201 comprising a stack of images I 202. The image stack or cube 201 comprises a total of n images I 202, each such image $I_n$ comprising x by y pixels p 203. Each pixel p 203 has a luminance value L. Each image $I_n$ 202 and thus each pixel p 203 is associated with a predetermined frequency band $f_n$. The image stack 201 represents a range of frequencies from a minimum frequency to a maximum frequency $f_{max}$. In the present embodiment, the dynamic range of the pixel luminance values L and the frequency values f are outside that perceptible by humans and displayable on the display 104.

Figure 2B:
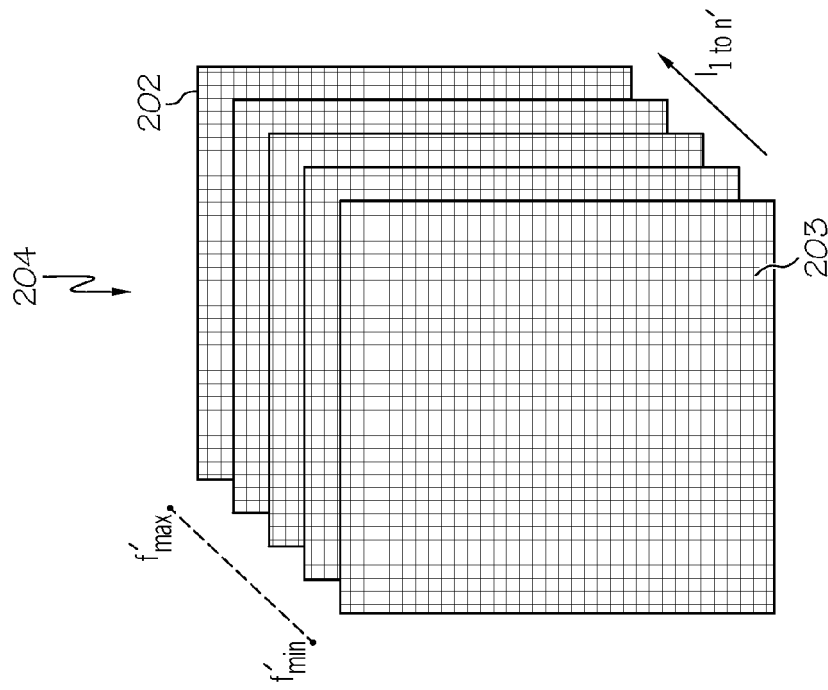
FIGS. 2A & 2B are schematic illustrations of the structure of an uncompressed and a compressed version of an HDR dataset in the computer system of FIG. 1, respectively, in accordance with an embodiment of the present invention.
Figure 2A:
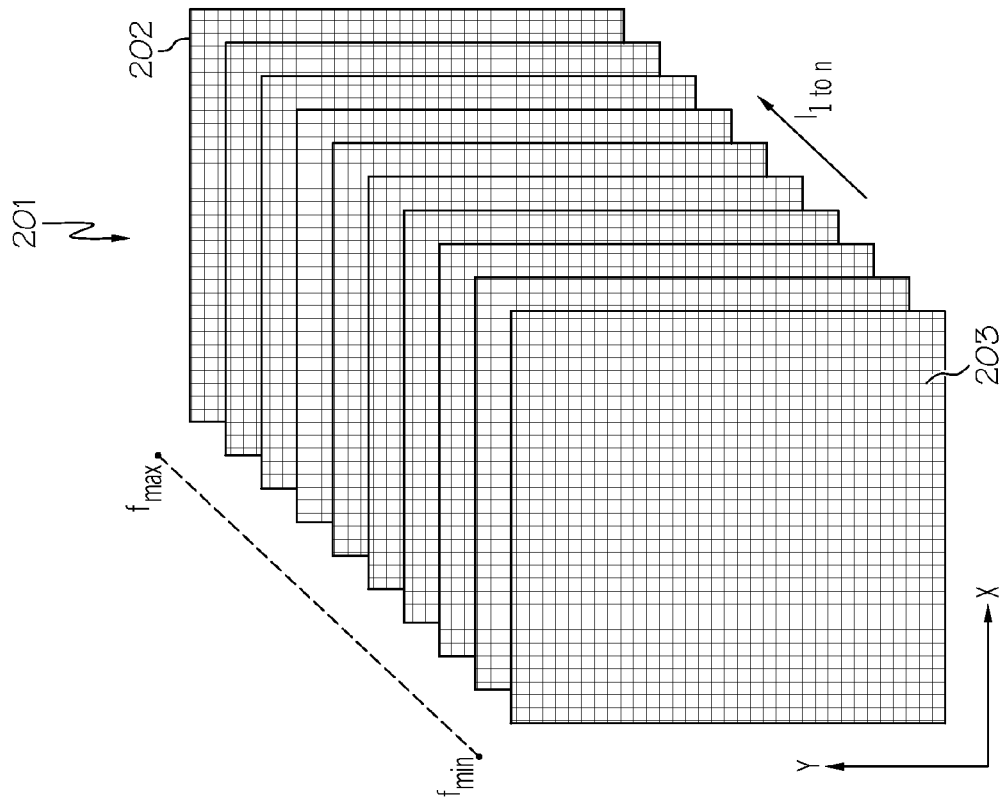

With reference to FIG. 2B, in conjunction with FIG. 1, the HDR data compression module 109 is arranged to compress the HDR image data 110 so that the dynamic range of both the luminance variate L and the frequency variate f of the compressed HDR image data 204 is within the displayable limits of the display 104 in accordance with an embodiment of the present invention. Firstly, the dynamic range of the luminance values L of the HDR data 110 are compressed using a tone-mapping algorithm, with the compressed luminance values being denoted herein as L'. In the present embodiment, the tone-mapping algorithm uses a local tone mapping function, that is, the parameters of the function are non-linear and so may change for a given pixel p 203, in accordance with features extracted from the surrounding pixels p 203. Thus, the effect of the tone-mapping algorithm changes for each pixel p 203 according to the local features of the relevant image I 202 and its adjacent images. In other words, the local tone mapping is performed in three data dimensions.

Secondly, the dynamic range of the frequency values f of the HDR image data 110 are compressed relative to the compression of the corresponding luminance values L. For each pixel p 203, the luminance difference ΔL between a given pixel p 203 in a given image $I_n$ 202 and the adjacent pixel p 203 in the subsequent image $I_{n+1}$ is defined as follows:

$$\Delta L(x,y,f_n) = |L(x,y,f_n + \Delta f) - L(x,y,f_n)|$$

where $f_n$ is the value range in the frequency band of a given image $I_n$ 202 in the original uncompressed image stack 201; $p(x, y, f_n)$ is a pixel p 203 in image $I_n$ 202; and $\Delta f = f_{n+1} - f_n$ is the frequency shift or difference between any two successive images 1202 in the image stack 201.

A mapping function $M(x, y, f_n)$ is then defined for each pixel p 203 as follows:

$$M(x, y, f_n) = \frac{\Delta L(x, y, f_n)}{\sum_{i=1}^{n} \Delta L(x, y, f_i)}$$

In the present embodiment, the mapping function for a given pixel p is inversely related to the compression of the luminance value for that pixel p.

With reference to FIG. 2B, a user sets lower and upper frequency limits, denoted as $f'_{min}$ and $f'_{max}$ respectively, for the compressed image stack 204. A pixel in an image $I_n$ with frequency $f_n$, $p(x, y, f_n)$, is thus mapped into a pixel $p'(x, y, f'_n)$, where the compressed frequency $f'_n$ defined as:

$$f'_n = f'_{min} + (f'_{max} - f'_{min}) \sum_{i=1}^{n} M(x, y, f_i)$$

As a result of the mapping function M, the compression of the second variate for a given pixel is relative to the compression of the first variate for that pixel. In the present embodiment, the degree of compression of the frequency variate is inversely related to the variation of the luminance variate after compression.

The compressed frequency values $f'_n$ of the pixels p' will no longer fall into the frequency-defined images $I_n$ or of the original uncompressed image stack 201. Each output compressed image will be associated with various frequencies of the original uncompressed images $I_n$ because the compression of the frequency variate of a given pixel has been performed on a pixel by pixel basis in relation to the luminance compression for the given pixel. In the present embodiment, the compressed frequency values $f'_n$ are linearly interpolated into a predetermined number n' of compressed frequency images $I_{n'}$ for the output compressed image stack 204. In addition to the upper and lower frequency limits $f'_{min}$ and $f'_{max}$, the user may also determine the number n' of images $I_{n'}$ in the compressed image stack 204.

In the present embodiment, the number n' of compressed frequency images $I_{n'}$ is less than the number n of images $I_n$ in the uncompressed image stack 201. For example, given an uncompressed image stack 201 with a pixel luminance P dynamic range of $10^6$ comprising 1000 images I (n=1000), the lowest frequency image h representing a frequency $f_{min}$ of 1 THz and the highest frequency image $I_{1000}$ representing a frequency $f_{max}$ of 1000 THz, the separation between each image I will be 1 THz assuming equal frequency band differences between images. In other words, each image I covers a 1 THz frequency band. Compressing the dynamic range of the luminance values P to 8 bits for use with 8 bit displays and performing the relative frequency value compression described above with a lower frequency limit $f'_{min}$ specified as 400 THz and an upper frequency limit $f'_{max}$ specified as 800 THz will thus result in a reduction in the number of images n', from 1000 for the uncompressed image stack 201 to 400 for the compressed image stack 204 if the image I' band width is maintained at 1 THz.

Figure 3A:
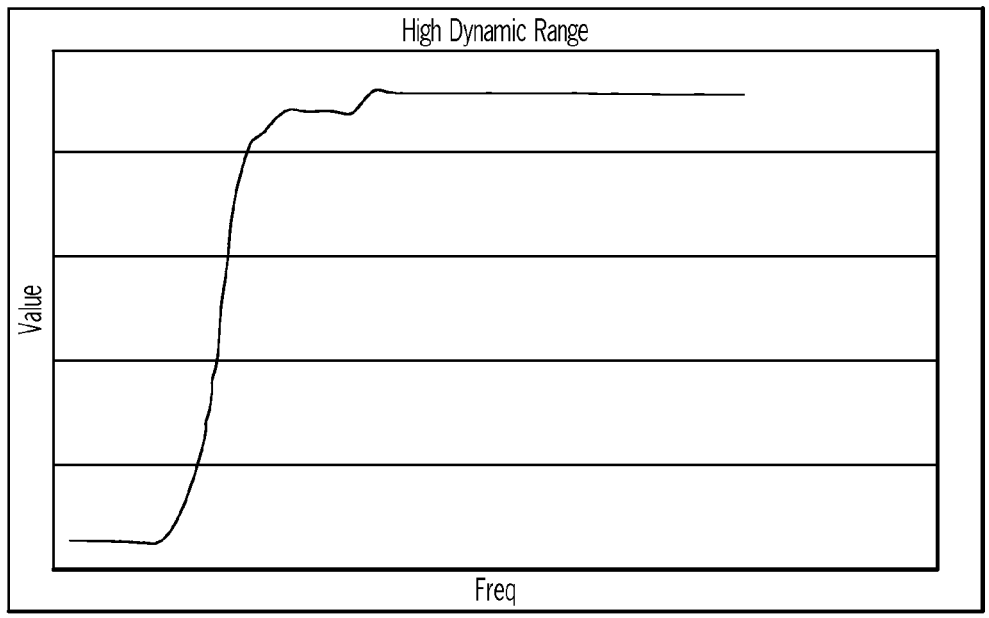
FIGS. 3A & 3B are graphs illustrating the compression of one variate relative to the compression of another variate of the HDR data set in the computer system of FIG. 1 in accordance with an embodiment of the present invention.
Figure 3B:
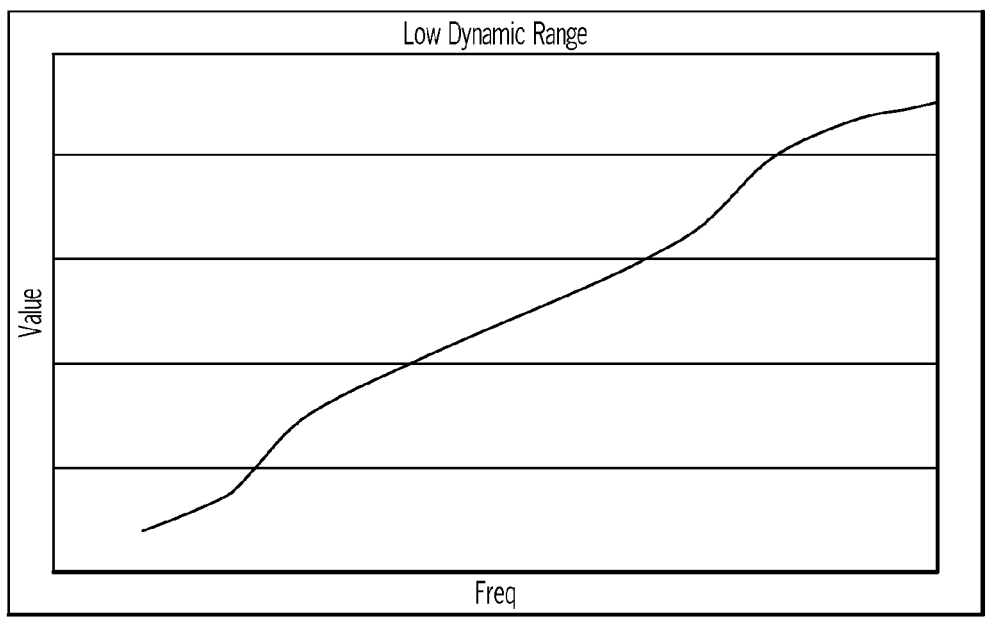

FIG. 3A shows the pixel value profile in the uncompressed image stack 201 (FIG. 2A) with respect to frequency in accordance with an embodiment of the present invention. Referring to FIG. 3A, the x-axis (identified as "Freq" in FIG. 3A) represents pixel frequency values $f_n$ and the y-axis (identified as "Value" in FIG. 3A) represents pixel luminance values P. FIG. 3B shows the pixel profile resulting from the application of the two variate relative compression method described above in relation to the pixel luminance (represented by the y-axis which is identified as "Value") and frequency values (represented by the x-axis which is identified as "Freq") in accordance with an embodiment of the present invention. The compressed profile illustrates that the compression is performed is such a way that areas of relatively low variation in luminance are compressed more highly while areas with relatively high variation are compressed less or even expanded, depending on the degree of variation.

Figure 4:
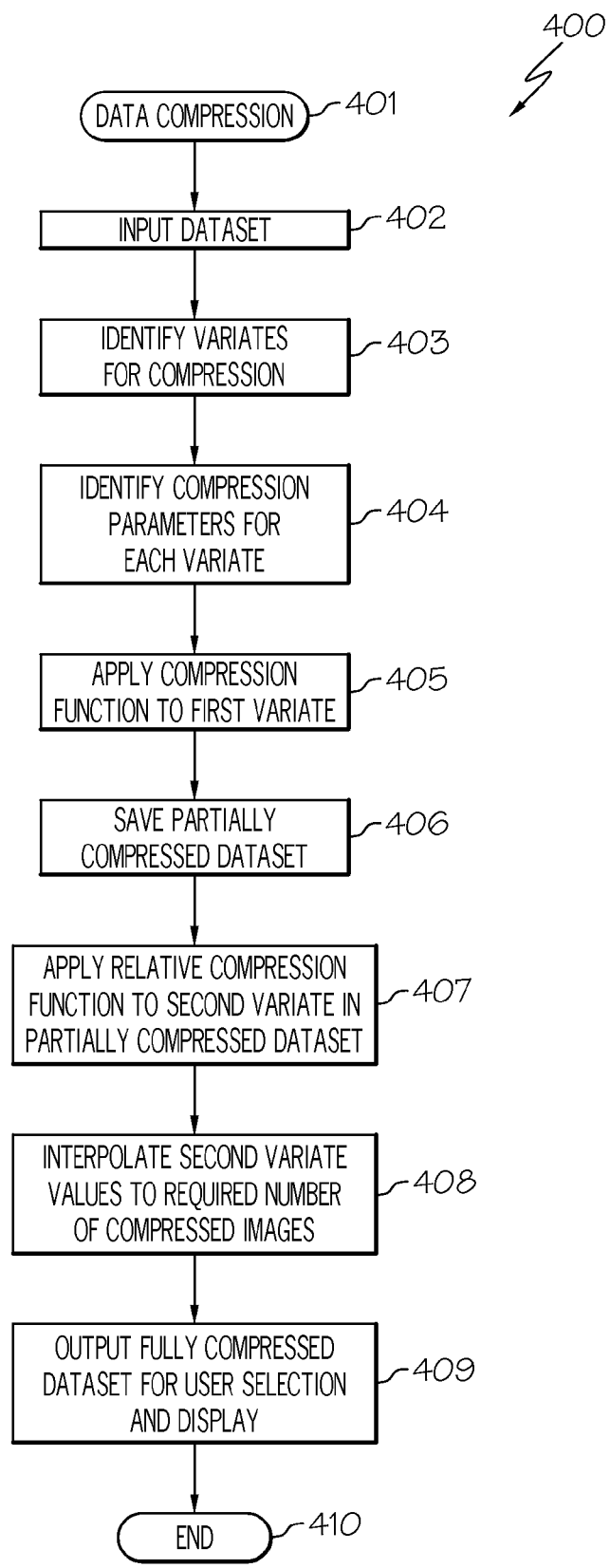
FIG. 4 is a flowchart of a method for compressing an HDR dataset of FIG. 2A in accordance with an embodiment of the present invention.

The processing performed by the HDR compression module 109 (FIG. 1) when compressing the HDR image data 110 (FIG. 1) will now be described in further detail with reference to the flowchart of FIG. 4. FIG. 4 is a flowchart of a method 400 for compressing an HDR dataset of FIG. 2A in accordance with an embodiment of the present invention. Referring to FIG. 4, in conjunction with FIGS. 1, 2A and 2B, processing is initiated at step 401 and moves to step 402 where the dataset for compression is input and processing moves to step 403. At step 403 the variates for compression, such as the pixel luminance and pixel frequency, are identified and processing moves to step 404. At step 404, the compression parameters for each variate are identified, such as the relevant tone-mapping parameters for the luminance variate and the lower and upper frequency limits $f'_{min}$, $f'_{max}$ and the number n' of compressed frequency images $I_{n'}$ for the frequency variate. Processing then moves to step 405 where the compression parameters are applied to the first variate and processing moves to step 406. At step 406, the partially compressed dataset is saved and processing moves to step 407. At step 407, the compression of the second variate is performed relative to the variation of the first variate in the partially compressed dataset and processing moves to step 408. At step 408, the values of the second variate are linearly interpolated to the required number of compressed frequency images $I_{n'}$ and processing moves to step 409. At step 409, the fully compressed dataset is saved for subsequent user selection and display and processing moves to step 410 and ends.

With reference to FIG. 1, once the HDR image data 110 has been compressed as describe above, the HDR data-handling module 108 is arranged to enable a user to select and display the compressed image data 110 in accordance with one or more criteria or filters. For example, the user may select images based on the mean luminance per image or the coefficient of variation of luminance. The HDR data-handling module 108 is arranged to determine the image 203 of the compressed image data 110 that provides the closest match to the user's criteria or filter and to display that data to the user.

As will be understood by those in the art, embodiments of the present invention may be applied to any suitable dataset comprising two or more variates for relative compression. The relation between the compression of the variates is dependent on the mapping function, which may define any suitable relation between the two or more variates being compressed.

As will be understood by those skilled in the art, any suitable tone mapping or other applicable compression technique may be employed for compressing the value of the first variates in embodiments of the present invention. Local or global tone-mapping operators, that is, spatially varying or spatially uniform operators, may be used depending on the given application.

In another embodiment, while the frequency range of the compressed image stack is reduced, the number n' of compressed frequency images $I_{n'}$ is user determined so as to be equal to or larger than the number n of images $I_n$ in the uncompressed image stack 201 (FIG. 2A) once the compressed frequency values have been appropriately interpolated.

In another embodiment, no interpolation of the compressed frequency values is performed, instead leaving the compressed frequency values in their raw state in the compressed image stack.

In a further embodiment, the compressed frequency values $f'_n$ are non-linearly interpolated into a predetermined number n' of compressed frequency images $I_{n'}$ for the output compressed image stack. Such non-linear interpolation may be performed in accordance with any suitable predetermined function.

Embodiments of the present invention extend the use of tone mapping from single variable datasets to multi-variable datasets by compressing frequency coordinates relative to the change in the three dimensional tone mapped values. Each output tone mapped compressed plane is thus associated with various frequencies of the original planes in the uncompressed image stack.

Embodiments of the present invention may be further arranged to enable multi-variate tone mapping for applications, such as the tone mapping of colored standard high dynamic range images where both the luminance and color fidelity need to be preserved on significantly lower dynamic range displays. Embodiments of the present invention may therefore be arranged to provide compression for both color and luminance that mitigates the over-saturation or cartooning effects of the tone mapped images. Embodiments of the present invention may be applied to 3D MRI scans, di-tonic MRI or colored MRI.

It will be understood by those skilled in the art that the apparatus that embodies a part or all of the present invention may be a general purpose device having software arranged to provide a part or all of an embodiment of the present invention. The device could be a single device or a group of devices and the software could be a single program or a set of programs.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present invention in its broader aspects is not limited to the specific details of the representative apparatus and method, and illustrative examples shown and described. Accordingly, departures may be made from such details without departure from the spirit or scope of applicant's general inventive concept.

Figure 5:
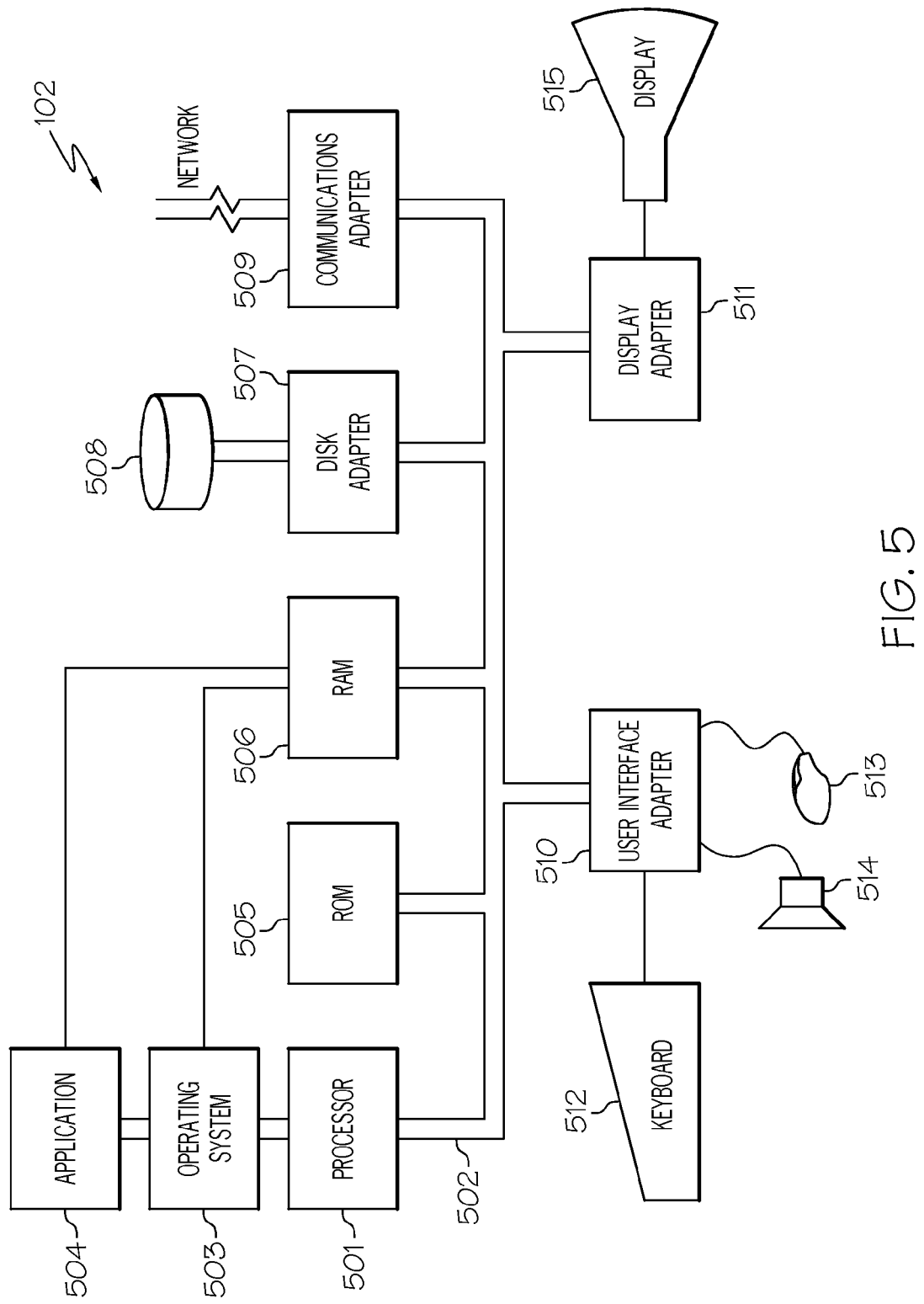
FIG. 5 depicts an embodiment of a hardware configuration of the computer system which is representative of a hardware environment for practicing the present invention.

FIG. 5 depicts an embodiment of a hardware configuration of computer system 102 (FIG. 1) which is representative of a hardware environment for practicing the present invention. Referring to FIG. 5, computer 102 has a processor 501 coupled to various other components by system bus 502. An operating system 503 may run on processor 501 and provide control and coordinate the functions of the various components of FIG. 5. An application 504 (e.g., operating system 106 of FIG. 1) in accordance with the principles of the present invention may run in conjunction with operating system 503 and provide calls to operating system 503 where the calls implement the various functions or services to be performed by application 504. Application 504 may include, for example, an application for compressing a multivariate dataset as discussed above.

Referring again to FIG. 5, read-only memory ("ROM") 505 may be coupled to system bus 502 and include a basic input/output system ("BIOS") that controls certain basic functions of computer system 102. Random access memory ("RAM") 506 and disk adapter 507 may also be coupled to system bus 502. It should be noted that software components including operating system 503 and application 504 may be loaded into RAM 506, which may be computer system's 102 main memory for execution. Disk adapter 507 may be an integrated drive electronics ("IDE") adapter that communicates with a disk unit 508, e.g., disk drive.

Computer system 102 may further include a communications adapter 509 coupled to bus 502. Communications adapter 509 may interconnect bus 502 with an outside network thereby allowing computer system 102 to communicate with other similar devices.

I/O devices may also be connected to computer system 102 via a user interface adapter 510 and a display adapter 511. Keyboard 512, mouse 513 and speaker 514 may all be interconnected to bus 502 through user interface adapter 510. A display monitor 515 (e.g., display 104 of FIG. 1) may be connected to system bus 502 by display adapter 511. In this manner, a user is capable of inputting to computer system 102 through keyboard 512 or mouse 513 and receiving output from computer system 102 via display 515 or speaker 514.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for compressing a multivariate dataset, the method comprising:
    selecting a dataset comprising a plurality of variates;
    applying a first compression method to values of a first variate of the dataset; and
    applying, by a processor, a second compression method to values of a second variate of the dataset, wherein the second compression method is arranged to compress the second variate values relative to a variation of corresponding first variate values.

2. The method as recited in claim 1, wherein the compression of the second variate values is inversely related to the variation of the corresponding first variate values.

3. The method as recited in claim 1, wherein the second variate values are compressed relative to uncompressed first variate values.

4. The method as recited in claim 1, wherein the second variate values are compressed relative to compressed first variate values.

5. The method as recited in claim 1, wherein the second variate values are compressed to a predetermined range.

6. The method as recited in claim 1, wherein the compressed second variate values are interpolated to a predetermined set of value ranges.

7. The method as recited in claim 6, wherein the interpolation is linear.

8. The method as recited in claim 1, wherein the dataset represents image data and the first and second variates comprise pixel amplitude and frequency.

9. The method as recited in claim 8, wherein the pixel amplitude represents luminance.

10. The method as recited in claim 1, wherein the first compression method comprises a tone mapping method.

11. The method as recited in claim 10, wherein the tone mapping method is arranged to perform spatially uniform compression.

12. The method as recited in claim 10, wherein the tone mapping method is arranged to perform spatially varying compression.

13. A computer program product embodied in a computer readable storage medium for compressing a multivariate dataset, the computer program product comprising the programming instructions for:
    selecting a dataset comprising a plurality of variates;
    applying a first compression method to values of a first variate of the dataset; and
    applying a second compression method to values of a second variate of the dataset, wherein the second compression method is arranged to compress the second variate values relative to a variation of corresponding first variate values.

14. The computer program product as recited in claim 13, wherein the compression of the second variate values is inversely related to the variation of the corresponding first variate values.

15. The computer program product as recited in claim 13, wherein the second variate values are compressed relative to uncompressed first variate values.

16. The computer program product as recited in claim 13, wherein the second variate values are compressed relative to compressed first variate values.

17. The computer program product as recited in claim 13, wherein the second variate values are compressed to a predetermined range.

18. The computer program product as recited in claim 13, wherein the compressed second variate values are interpolated to a predetermined set of value ranges.

19. The computer program product as recited in claim 18, wherein the interpolation is linear.

20. A system, comprising:
    a memory unit for storing a computer program for compressing a multivariate dataset; and
    a processor coupled to the memory unit, wherein the processor, responsive to the computer program, comprises:
        circuitry for selecting a dataset comprising a plurality of variates;
        circuitry for applying a first compression method to values of a first variate of the dataset; and
        circuitry for applying a second compression method to values of a second variate of the dataset, wherein the second compression method is arranged to compress the second variate values relative to a variation of corresponding first variate values.

21. The system as recited in claim 20, wherein the compression of the second variate values is inversely related to the variation of the corresponding first variate values.

22. The system as recited in claim 20, wherein the second variate values are compressed relative to uncompressed first variate values.

23. The system as recited in claim 20, wherein the second variate values are compressed relative to compressed first variate values.

24. The system as recited in claim 20, wherein the second variate values are compressed to a predetermined range.

25. The system as recited in claim 20, wherein the compressed second variate values are interpolated to a predetermined set of value ranges.

* * * * *